US008672362B1

(12) United States Patent
Holt et al.

(10) Patent No.: US 8,672,362 B1
(45) Date of Patent: Mar. 18, 2014

(54) SINGLE-PIECE TAG

(75) Inventors: Robert Holt, Cornwall, NY (US); David J. Haas, Suffern, NY (US)

(73) Assignee: Brady Worldwide, Inc., Milwaukee, WI (US)

( * ) Notice: Subject to any disclaimer, the term of this patent is extended or adjusted under 35 U.S.C. 154(b) by 1032 days.

(21) Appl. No.: 12/186,384

(22) Filed: Aug. 5, 2008

Related U.S. Application Data

(63) Continuation of application No. 10/674,882, filed on Sep. 30, 2003, now Pat. No. 7,898,907.

(60) Provisional application No. 60/414,880, filed on Oct. 1, 2002.

(51) Int. Cl.
*B42D 15/00* (2006.01)
*B32B 9/00* (2006.01)
*B32B 33/00* (2006.01)
*G01D 21/00* (2006.01)

(52) U.S. Cl.
USPC ............ 283/81; 428/40.1; 428/42.2; 116/206

(58) Field of Classification Search
USPC ............ 283/81, 94, 101, 105, 106, 107, 114; 40/625, 626, 628, 630; 116/200, 206, 116/278; 428/40.1, 42.2, 195.1, 202; 368/327
See application file for complete search history.

(56) References Cited

U.S. PATENT DOCUMENTS 3,065,083 A 11/1962 Gessler
3,520,124 A 7/1970 Myers
3,726,645 A 4/1973 Kaczmarek
3,914,174 A 10/1975 Fuchs
4,057,029 A 11/1977 Seiter
4,065,263 A 12/1977 Woodbridge, III
4,292,926 A 10/1981 Tilman
4,420,353 A 12/1983 Levine
4,428,908 A 1/1984 Ashley et al.
4,752,448 A 6/1988 Wells et al.
4,788,039 A 11/1988 Glattstein
4,962,043 A 10/1990 Nagase et al.
5,045,283 A 9/1991 Patel
5,053,339 A 10/1991 Patel
5,296,380 A 3/1994 Margalit
(Continued)

FOREIGN PATENT DOCUMENTS

WO 03/077227 9/2003

OTHER PUBLICATIONS

United States Patent and Trademark Office, Office Action Summary and Detailed Action, U.S. Appl. No. 13/012,954, May 24, 2011.

*Primary Examiner* — Kyle Grabowski
(74) *Attorney, Agent, or Firm* — Quarles & Brady LLP

(57) ABSTRACT

A single piece tag includes a substrate having a first surface and an opposing second surface. A first reactant is applied to the first surface. A first portion of the first reactant is covered by a first release liner. A second reactant is applied to the first release liner which separates the second reactant from the first reactant. A second release liner adjacent the first release liner covers a second portion of the first reactant. The tag is activated by removing the second release liner from the tag to expose the second portion of the adhesive, and the substrate is folded onto itself to contact the second reactant on the first release liner with the first reactant.

15 Claims, 9 Drawing Sheets

(56) References Cited

U.S. PATENT DOCUMENTS

| | | | |
|---|---|---|---|
| 5,364,132 A | 11/1994 | Haas et al. | |
| 5,446,705 A | 8/1995 | Haas et al. | |
| 5,457,054 A | 10/1995 | Geisinger et al. | |
| 5,602,804 A | 2/1997 | Haas | |
| 5,629,164 A | 5/1997 | Rivers | |
| 5,635,403 A | 6/1997 | Bailey | |
| 5,648,047 A | 7/1997 | Kardish et al. | |
| 5,715,215 A | 2/1998 | Haas et al. | |
| 5,719,828 A | 2/1998 | Haas et al. | |
| 5,785,354 A | 7/1998 | Haas | |
| 5,822,280 A | 10/1998 | Haas | |
| 5,873,606 A | 2/1999 | Haas et al. | |
| 5,890,743 A * | 4/1999 | Garrison et al. | 283/109 |
| 5,930,206 A | 7/1999 | Haas et al. | |
| 5,947,369 A | 9/1999 | Frommer et al. | |
| 5,957,458 A | 9/1999 | Haas et al. | |
| 6,426,230 B1 | 7/2002 | Feistel | |
| 6,544,925 B1 * | 4/2003 | Prusik et al. | 503/201 |
| 6,752,430 B2 | 6/2004 | Holt et al. | |
| 7,294,379 B2 | 11/2007 | Ko et al. | |
| 7,372,780 B1 | 5/2008 | Braunberger | |
| 7,742,367 B2 | 6/2010 | Haas | |
| 7,817,498 B1 | 10/2010 | Hinckley | |
| 2004/0013839 A1 | 1/2004 | Ko et al. | |
| 2008/0044310 A1 | 2/2008 | Haas | |

* cited by examiner

SINGLE-PIECE TAG

CROSS REFERENCES TO RELATED APPLICATIONS

This application is a continuation of U.S. patent application Ser. No. 10/674,882 filed on Sep. 30, 2003, now U.S. Pat. No. 7,898,907 which claims the priority of Provisional Patent Application Ser. No. 60/414,880, filed Oct. 1, 2002, the entire disclosures of which are expressly and fully incorporated herein by reference.

STATEMENT REGARDING FEDERALLY SPONSORED RESEARCH

Not Applicable

TECHNICAL FIELD

This invention relates to self-expiring tags, such as badges, labels, and disposable tags, used by security personnel guarding a secure area, facility, or transportation vehicle to indicate that a person, package, or vehicle entering such secure areas is permitted to be therein.

DESCRIPTION OF THE BACKGROUND ART

The time dependant color-changing process or function employed in all of the embodiments described herein is a well-known technology. In particular there are numerous patents issued to the inventors herein relevant to self expiring passes and parking permits. Examples of these products and the technology used by these products are represented by the Haas patents, e.g., U.S. Pat. Nos. 5,364,132; 5,446,705; 5,602,804; 5,715,215; 5,873,606; 5,719,828; 5,785,354; 5,822,280; 5,930,206; and 5,957,458. These products have become universally accepted as the means for controlling and improving visitor security and temporary badges, and are generally self-expiring visitor badges, which change color, and show an "expired" indicia after the predetermined authorization time has lapsed.

These prior art tags are typically formed from two parts that must be joined together to activate the color-changing process. This renders the tags difficult to work with. A need exists for a simple single piece self-expiring tag.

SUMMARY OF THE INVENTION

The present invention provides a single piece tag including a substrate having a first surface and an opposing second surface. A first reactant is applied to the first surface. A first portion of the first reactant is covered by a first release liner. A second reactant is applied to the first release liner which separates the second reactant from the first reactant. A second release liner adjacent the first release liner covers a second portion of the first reactant. The tag is activated by removing the second release liner from the tag to expose the second portion of the adhesive, and the substrate is folded onto itself to contact the second reactant on the first release liner with the first reactant.

A general objective of the present invention is to provide a single piece tag that is easily activated. This objective is accomplished by applying a second reactant onto a release liner separating the second reactant from the first reactant and then removing only portions of the release liner from the tag, such that portions of the release liner having the second reactant thereon remain, and upon folding of the substrate, the second reactant contacts the first reactant.

The foregoing and other objects and advantages of the invention will appear from the following detailed description. In the description, reference is made to the accompanying drawings which illustrate a preferred embodiment of the invention.

BRIEF DESCRIPTION OF THE DRAWINGS

The invention is explained in greater detail below by use of several embodiments, with reference to the accompanying drawings which show the following.

DETAILED DESCRIPTION OF THE PREFERRED EMBODIMENTS

Figure 1:
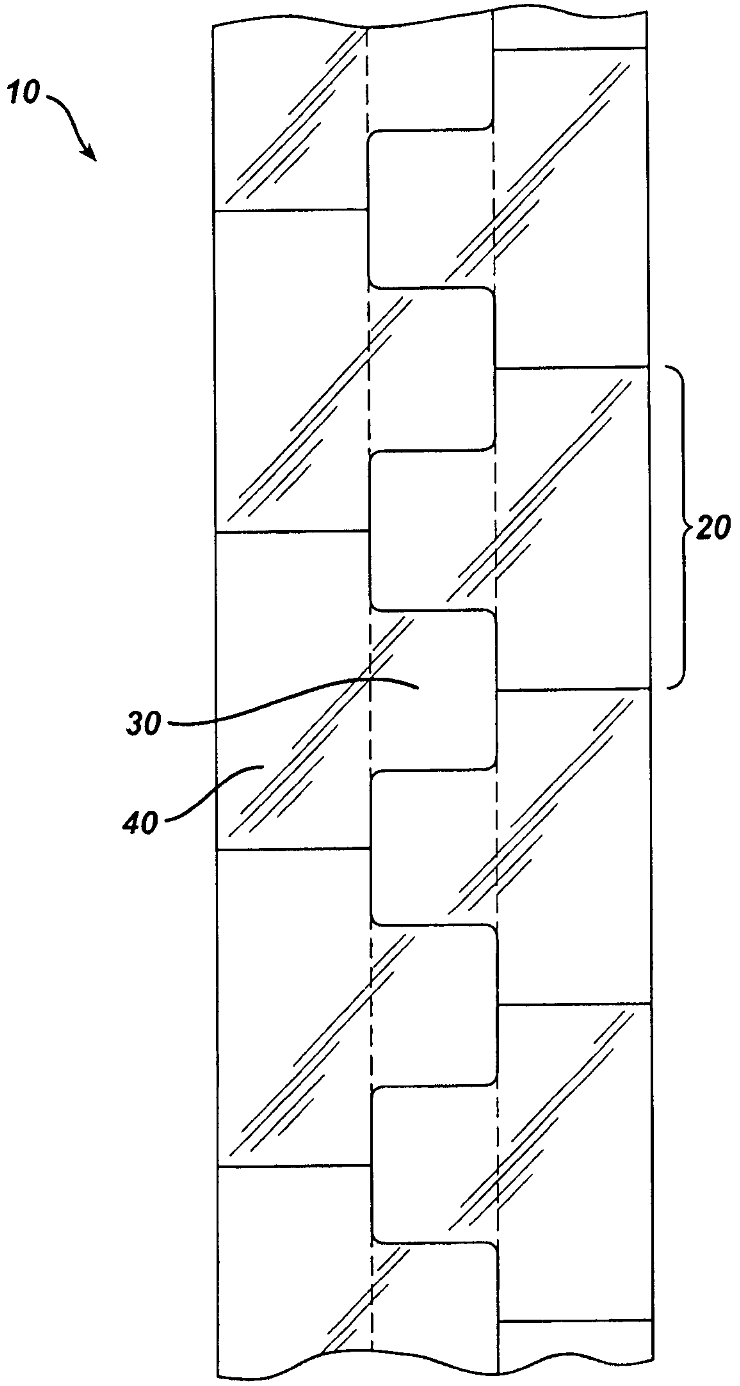
FIG. 1 shows a plan view of a plurality of inspection tags in sheet form.

Embodiments of the inventions described herein cover two functional types of one-piece tags: a) self-expiring tags, suitable for use as, labels, badges, inspection tags or tags, and the like, and b) testing tags to show that the article does or does not contain a target substance such as explosives. It is important that these tags be one-piece because the human factors involved with the person performing the inspection are extremely important for the successful use of such a device. These embodiments do not require any auxiliary hardware, power source, or batteries. A security person cannot be expected to assemble two or more components properly while standing in a field or on a roadway, and the person may not have a table or work surface for such assembly. It is the one-piece, self-expiring construction of these embodiments that make the invention useful.

These tags are intended for use without other equipment or hardware. They are intended to be used by people in field operations (typically standing at remote locations) as well as at desk and inside facilities like airport concourses. What is more important, they are intended to be used by people who do not always have both hands available because of other tasks that they are performing. In an extreme case such as military situations, this may be while solders are holding their weapon with one hand. Thus, the simplicity of the operational process is an important factor.

An inspection can be for any of a variety of purposes; custom regulated items, security items, contraband items, or excluded items like liquor, etc. Even though the inspection tags of this invention can be used in certain situations to seal the inspected article, this is not its primary purpose. The inspection tags are intended to be attached to an inspected article or document. After a period of time, such as one day, the inspection tag will change color or show words like 'VOID' to prevent the tags from being usable in the future.

The inspection tags are intended to be used to sample the article for traces of specific substance such as explosives, narcotics, etc. Upon activating the tag, a color change will occur if traces of the substance are detected. The chemical technologies employed in these color-changing time-tags and the color-changing testing tags are well known.

Referring to commonly used self-expiring security badges employing the Visually Change-Paper technology, each VCP security badge consists of two separate parts, a pressure sensitive adhesive display front part and a migrating ink back part. When the adhesive front part is adhesive attached to the back part, the adhesive dissolves the migrating ink, the ink diffuses into the front part, and the front part changes color.

The present invention is a new construction which performs the same function as these two part badges, except it is a single unit construction. An inspected article means the object being inspected, such as a briefcase, a purse, and/or package. For definition purposes, these inspection tags contain an indicator area on the inspection tag or device that indicates a valid or void state of the inspection. Generally, this is an area on the device that is printed with a migrating ink or other chemical agents.

The time dependant color-changing process or function employed in all of the embodiments described herein is a well-known technology. In particular, the technology and products are described and claimed, for example, in the following U.S. Pat. Nos. 5,364,132; 5,446,705; 5,602,804; 5,715,215; 5,873,606; 5,719,828; 5,785,354; 5,822,280; 5,930,206; and 5,957,458. The entire disclosures of these patents are incorporated herein by reference.

The self-expiring tag of this invention eliminate the reuse problem associated with prior known devices because they change color after a predetermined time interval to prevent reuse of the devices. Because the device is permanently rendered void, its reuse is impossible. Further, because it cannot be used the next day, only one color of the product is required so that the inventory control of this single item is much simpler and more cost effective than non expiring devices.

One embodiment of the self-expiring tag of this invention is secure, meaning that it cannot be removed from an article and reapplied to another article. Additionally, the tag cannot be left on an article and used at another time. Additionally, the tag may be made so that it is tamper indicting, i.e., an attempt to remove the tag is obvious to one observing the tag after it has been tampered with. Surfaces covered with pressure sensitive adhesives can be made tamper indicating and resistant to removal by a variety of conventional means.

The self-expiring tag is comprised of an adhesive part and a display part. The display part has a migrating ink printed thereon and the adhesive part has an exposed adhesive surface. Whereas the two components are co-planar, they are laterally displaced and not in contact with each other. When used, the adhesive part is folded over so as to be positioned parallel to the display part, and it is then pressed onto the display surface to make intimate contact with the migrating ink. This is typically done with the fingers. This initiates the timed color-changing process by placing the migrating dye in contact with the diffusing adhesive material.

With the substrate of the tag being a clear plastic material like 0.001" or 0.002" polyester, people can view the indicating surface through the exposed side of the tag. With the remaining exposed adhesive surfaces, the tag can be attached to the article that was just inspected, or it could be attached to some document of the owner of the article. After a period of time the adhesive contact with the migrating ink causes the display part to change color or show VOID words.

These constructions of the self-expiring tag of this invention are a one-part construction and performs the same functions as the two part construction. However, the inspection tags of this invention can be of any size or shape. Broadly, a one-piece tag has a first portion of the top surface covered with an adhesive and a second portion of the top surface covered with migrating ink. When the migrating ink portion of the tag is folded over to contact the portion of the top surface covered with adhesive, the time function is activated. Subsequent thereto the remaining uncovered adhesive portion, if any, can be used to attach the tag to the inspected article. After the predetermined period of time the migrating ink bleeds to indicate expiration. Many variations of adhesive/migrating ink configurations may be used as long as the self-expiring tag is one piece with a foldable portion that activates the time function.

In another embodiment, the tag is used for the detection of a contaminant substance, for example, explosives, drugs, poisons, etc. Such an inspection tag is, in effect, being used as a testing device. The inspector removes the tag from its protective liner (typically silicone coated paper) and samples the suspect article by touching the adhesive portion (the adhesive part) to the surface of the article. This can be done repeatedly and the inspectors fingers can be used to press from the rear the adhesive surface of the tag onto the sampling surface. These tags are typically about 2" or 3" long in order to have enough surface area for the fingers to apply pressure. In trace explosives detection, some of the surface absorption and top surface contamination will remain attached to the adhesive of the tag. The adhesive of these tags will typically have organics captured in the adhesive itself, so this will assist with the transfer of the substances to the adhesive surface.

As in the self-expiring tag, the inspection tag is also comprised of two separate components, an adhesive part and a display part. The display part has one or more chemical agents printed thereon and the adhesive part has an exposed adhesive surface. Whereas the two components are co-planar, they are laterally displaced and not in contact with each other. When used, the display part component is folded over so as to be exactly positioned parallel to the adhesive part component, and it is then pressed onto the back part adhesive surface. This is typically done with the fingers. This initiates the chemical reaction process by placing the chemical agents in contact with the adhesive material which contains the trace explosive (substance) material.

With the substrate of the inspection tag being a clear plastic material like 0.001" or 0.002" polyester, people can view the indicating surface through the exposed side of the tag. The chemical reaction and color change may occur in a matter of seconds, so the inspector can determine very quickly if the article has been exposed to explosive materials or contamination. With the remaining exposed adhesive surfaces, the inspection tag can be attached to the article that was just inspected, or it could be attached to some document of the owner of the article.

Whereas the configuration of the inspection tag can be a variety of forms such as those shown as the T-tag configuration, the rectangular configuration, and others, each configuration possesses the four specific functional components required in the testing function. These four functional components are the adhesive sampling surface, the color-forming reactant surface, the fold-over activation (and alignment) property, and the clear viewing window property.

Depending on whichever configuration is used, the tag can provide the (additional) property of attaching the testing tag to the article or to documents associated with the article. Since the testing tag will provide verification results of the security or analytical test, it is important to be able to associate the specific testing tag with a particular article. Many color forming reactants have been published in the patent literature. For our description here, we shall just list a sample of those specific for explosives trace detection. These reactants can be applied as discrete circles or squares on the testing tag reactant surface or as discrete bands along the testing tag reactant surface. Bands of reactant are preferred along the testing surface because bands of chemicals can be applied continuously from solution during the production process. From the functional point of view, bands will provide a larger area for detecting explosives on the adhesive samples surface. A sample explosive that does not cover the entire sampling surface could very well miss a circle of reactant when the adhesive sampling surface if folded over on the reactant surface.

An example of a detection system that could be used in this invention is described in U.S. Pat. No. 5,296,380 to Margalit, the entire disclosure of which is incorporated herein by reference. Thus, for example, to detect nitroaromatic explosives, the first reagent band could be an alkaline resin containing an diazotizable amino aromatic azo-dye precursor; for detecting organic nitrates and nitramines, the second reagent could be an acidic resin containing nitrate to nitrite ion reducing agent and a diazo-coupler; for detecting inorganic nitrates, the third resin could be a resin containing zinc powder; for detecting chlorates and bromates, the fourth reagent could be an acidic resin with inorganic nitrates and an aniline salt. Margalit states that these four color detection reagents provide an excellent system for examining the sample of explosives for detection.

Another example of a detection system that could be used in this invention is described in U.S. Pat. No. 4,788,039 to Glattstein, the entire disclosure of which is incorporated herein by reference. Thus, for example, the adhesive sampling layer can include a solvent such as dimethylsulfoxide and a coating of tetra-alkyl ammonium or phosphonium hydroxide on the reactant surface. Glattstein states that this change accelerates the elimination reaction of nitrate esters, producing the preferred nitrate ions which can be readily detected by a second reagent that produces the well-known Griess reaction to produce a colored azo dye. This dye color change can be viewed on the reaction surface through the clear support film which acts as the viewing window. Glattstein also states that nitroamines undergo alkaline cleavage to form nitrite ions, which produce the same colored azo compound by the Griess reaction. Likewise, polynigroaromatics form lightly colored (violet-dark) compounds upon reaction with this reaction. Thus, this provides a multi-reagent test kit for the presumptive identification of traces of explosives.

Figure 2:
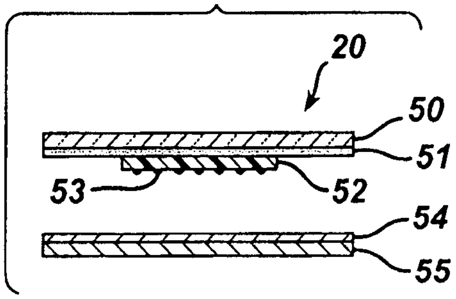
FIG. 2 shows a cross section of the tags of FIG. 1.

Referring to FIGS. 1 and 2, the tag 20 comprises a clear substrate 50 which forms the facestock for the web assembly 10. Substrate 50 may, for example be polyester film with thickness of to 10 mils. The substrate 50 is clear so that the color change caused by reactant 53 can be viewed. Printing may be applied to the front of the substrate 50. Such printing could be instructions such as fold-over or fold-here. Other printing could provide identification to the user of the inspection tag and would add security to prevent counterfeiting or substituting another tag in its place.

Figure 3:
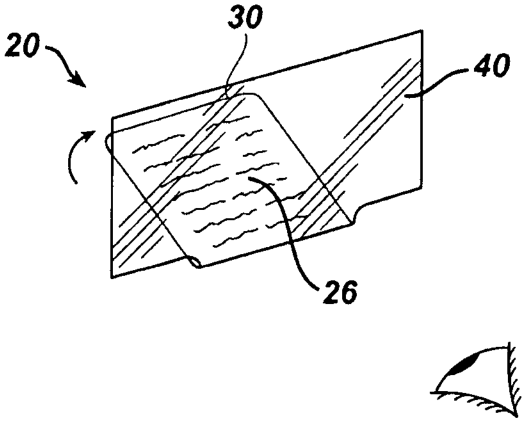
FIG. 3 shows a perspective view of a portion of an inspection tag shown in FIG. 1 partially folded onto itself along a fold line.

Referring to FIGS. 1 and 3, web 10 could be die-cut into a plurality of tags 20. The tags 20 could be of any shape that is convenient to the user, e.g., rectangular, round, or the preferred T shape as shown in the Figures herein. The T shape permits the reactant display surface 30 to be easily folded over onto the adhesive sampling surface 40. By this construction, the display surface 26, 30 sticks to the central adhesive portion of the adhesive sampling surface 40 of the T shaped tag 20, while leaving both ends of adhesive sampling surface 40 exposed for attaching the tag 20 to the inspected article, person, or the documents associated therewith.

Referring to FIG. 2, on the underside of the clear substrate 50 is a clear adhesive 51 which may have various organics mixed within the adhesive to form the solvent for the color forming reactions. The adhesive coating 51 covers the entire surface of substrate 50 and is protected from the environment by the silicone coating 54 on the release paper 55. This is a well known means of construction for pressure sensitive film materials. Printing, such as instructions, can be applied to the rear surface of the release liner 55.

Referring to FIG. 2, attached to the adhesive layer 51 and sandwiched between the facestock 50 and the release liner 55 is the display surface 52 with the color forming reactants on the surface in contact with the silicone liner 54. The color forming chemicals or reactants can be printed as a uniform coating 53 on the display surface 52 or they can be applied in patterns or bands. In any case, the display surface 52 is normally non-porous so as not to absorb or permit any of the organic liquids in the adhesive 51 on the clear substrate 50 to penetrate therethrough.

In one embodiment, when using the tag 20 to test for reactants, one lifts the tag 20 off the release liner 54; 55, contacts the adhesive 51 and reactant 53 several times to a surface to be tested, e.g., luggage handle, to get a sample of any residue. Referring to FIG. 3, the display surface or flap 26 is then folded onto the opposing adhesive 40 to initiate the reaction and color change process. (See FIG. 4)

Figure 4:
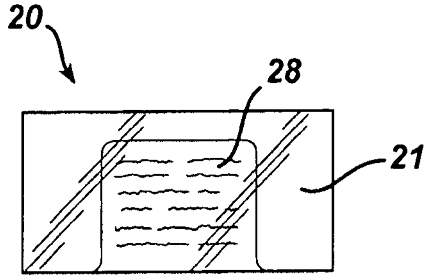
FIG. 4 shows a plan view of the inspection tag shown in FIG. 3 folded onto itself along the fold line.

The tag 20, as shown in its activated form in FIG. 4, is attached to the inspected article or related documents by adhering the adhesive area 21 not covered by flap 26 to the article. One can then see through the flap 30 through window 26 the change in color from, for example, indicia 28 in FIG. 4 indicating non-void to a void indicia 22 in FIG. 5.

As shown in FIG. 3, the clear substrate 50 of the web becomes the viewing window 26 on the inspection tag 20 and carries a sample of the substance that was collected from the inspected article as well as the organic compounds and constituents for facilitating the reagent reactions on the display face 53 and provides adhesive 51 for the attachment extensions 21 on the sides of the tag.

Figure 5:
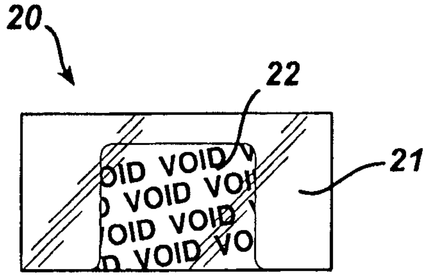
FIG. 5 shows a perspective view of the inspection tag shown in FIG. 4 a period of time after activation.

In the self-expiring tag 20 shown in FIG. 4, the display face is printed with a hidden pattern of migrating ink 28 and background printing. With colored dyes mixed with dark pigments like carbon black, the mezzo-tint pattern or patterned array of the inks. No words or distinctive colors are shown to alert the inspection personnel. After a period of time, the dyes diffuse laterally into the white spaces of the display area so that color changes or words will appear. FIG. 5 shows the display area 22 with alert words the void indicia VOID in distinctive colors. This self-voiding property of these tags make them valuable for security of the inspection process.

Figure 6:
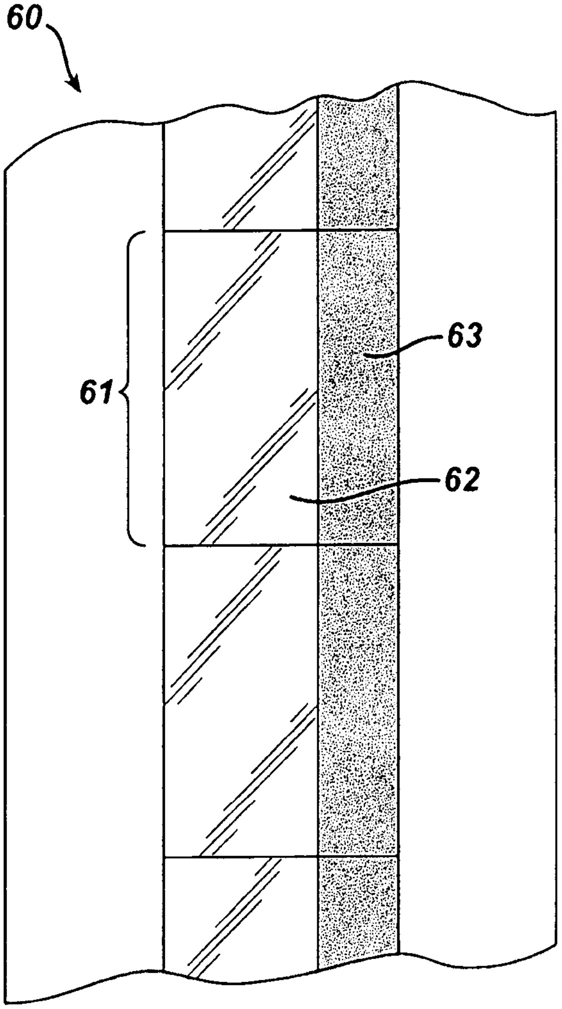
FIG. 6 shows a plan view of another embodiment of a plurality of inspection tags in sheet form.

FIG. 6 shows these inspection tags die-cut in a different shape such as a rectangle. In this case, the web 60 is constructed exactly as shown in FIG. 1 with the display material 52 sandwiched between the adhesive face stock 51 and the silicone liner 54. (see FIG. 2). The display material 62 is laid along one edge of the rectangular web 60 and leaves a portion of the clear adhesive facestock 62 exposed.

Figure 7:
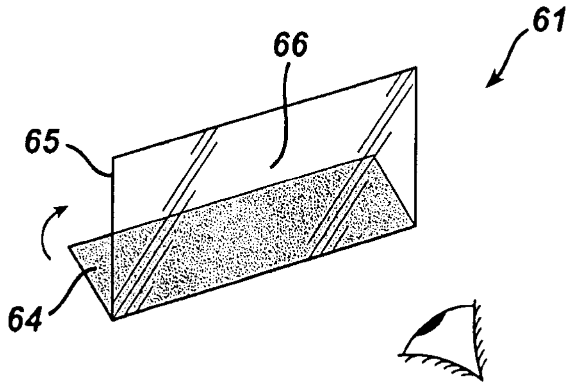
FIG. 7 shows a perspective view of a portion of an inspection tag shown in FIG. 6 partially folded onto itself along a fold line.

As shown in FIG. 7, the sampling for substances on articles is performed by touching the adhesive 64 to the surface of the article. The display area 64 is then folded over to initiate the color reactions or color timing sequence for time indicators.

Figure 8:
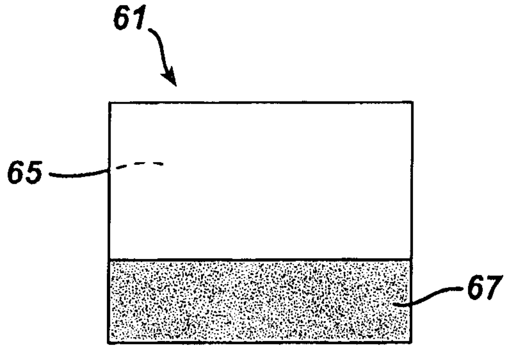
FIG. 8 shows a plan view of the inspection tag shown in FIG. 7 folded onto itself along the fold line.
Figure 9:
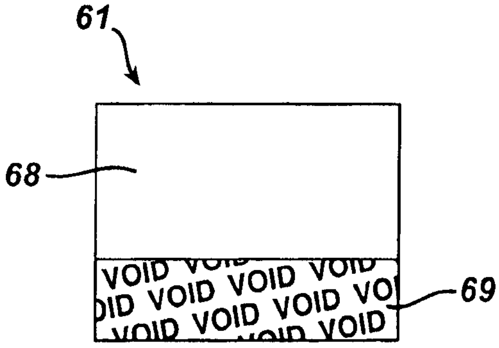
FIG. 9 shows a perspective view of the inspection tag shown in FIG. 8 a period of time after activation.

FIG. 8, shows the mezzo-tint pattern 67 while the exposed adhesive 65 is used to attach the tag to the inspected article. After a period of time, as shown in FIG. 9, a VOID indicia 69 appears.

Figure 10:
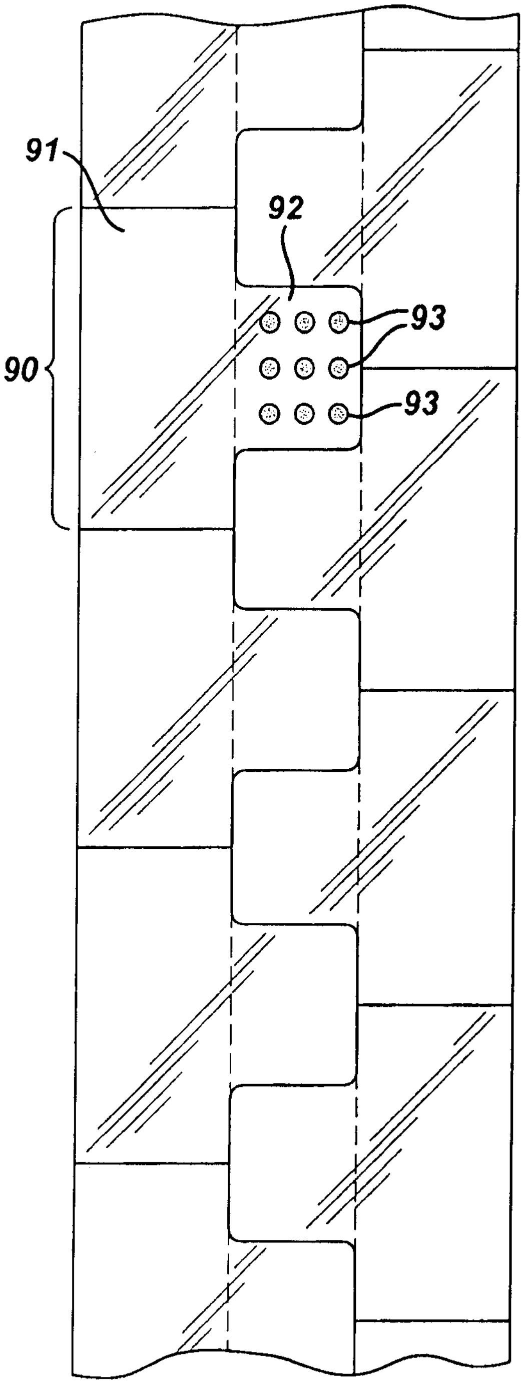
FIG. 10 shows a plan view of another embodiment of a plurality of inspection tags in sheet form.
Figure 11:
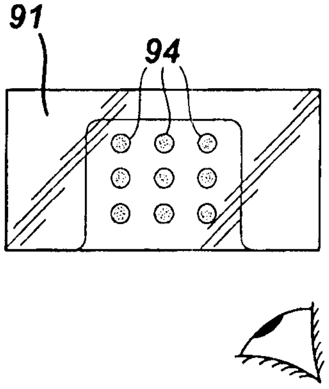
FIG. 11 shows a plan view of the inspection tag shown in FIG. 10 folded onto itself along the fold line.
Figure 12:
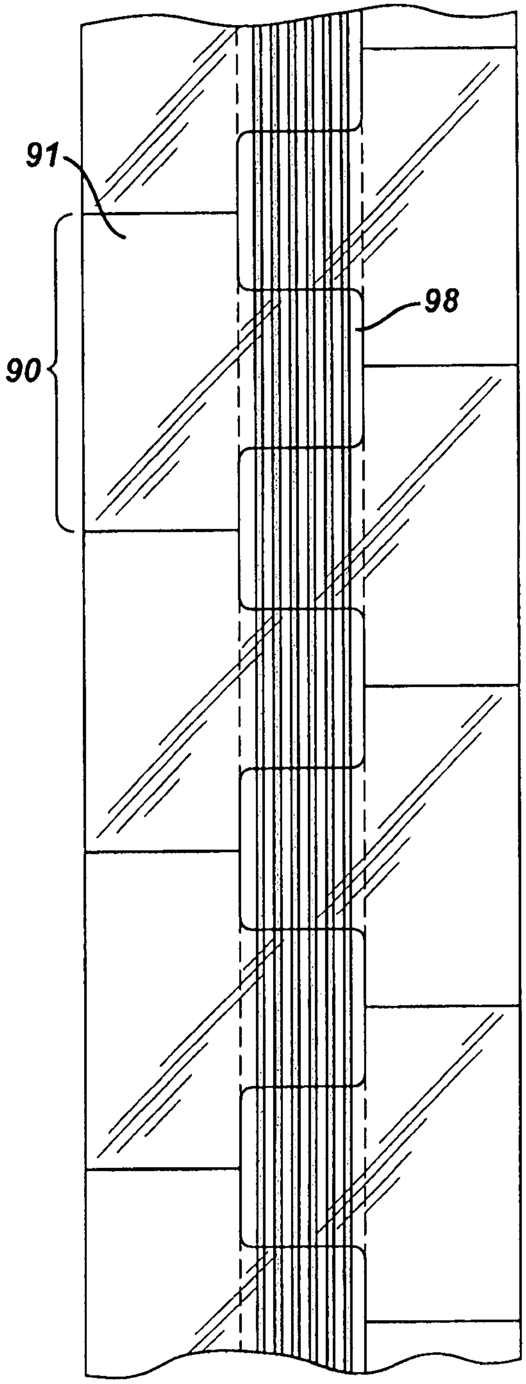
FIG. 12 shows a plan view of another embodiment of a plurality of inspection tags in sheet form.

Depending on the application, the color forming chemicals can be applied to the display surface in a variety of ways. They can be uniformly mixed into one coating or ink mixture and applied as a solid print onto the display surface. They can be printed as a pattern or text. As shown in FIG. 10, color forming reactants can also be applied in discrete areas so that each circle of reactant determines a specific substance or explosive. For example, the circles 93 on flap 92 could each contain reactants for different explosives and in this construction, the inspection tag would sample for 9 different explosives and show which type of explosive it is. When folded over, as shown in FIG. 11, the viewer looks at the array of circles 94 and their color change on the inspection tag, he would determine the type of explosive present by the position of the particular color circle. Likewise in FIG. 12, (the color reactants have been applied as continuous bands along the display area. The relative position of the bands that change color would indicate the specific substance detected.

Figure 13:
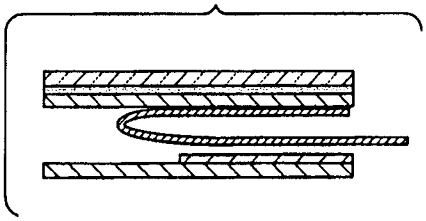
FIG. 13 shows a cross section of another embodiment of an inspection tag prior to activation.

Whereas we have shown inspection tags which are a single unit and simply fold over for activation, it is possible to construct inspection tags of several parts which perform the same function. A cross-sectional view of this type construction is shown in FIG. 13 where two materials have been attached together and the structure is activated in a similar manner of folding over a portion of the structure to bring the adhesive sampling area into contact with the color forming reactant display area.

Figure 14:
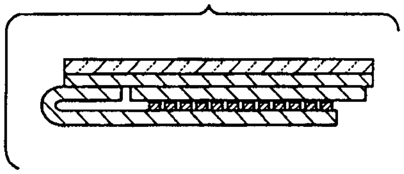
FIG. 14 shows a cross section of another embodiment of an inspection tag prior to activation.

It is also possible for construct these inspection tags with more complicated separators. For example, in FIGS. 13, 14, the separator between the adhesive sampling surface and the color forming reactants is in the form of a pull tab separator 98. The inspector exposes the adhesive surface by removing the separator 98, contacts the adhesive to sample the article surface for substances and then folds the adhesive back onto the color forming reactant display area.

Figure 15:
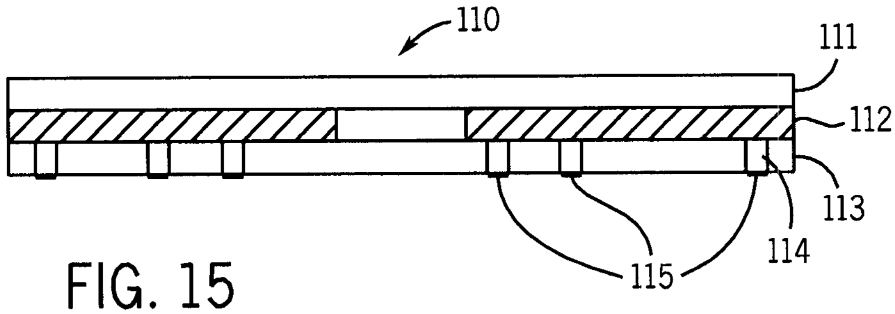
FIG. 15 shows a cross section of another embodiment of an single piece self-expiring tag prior to activation.
Figure 16:
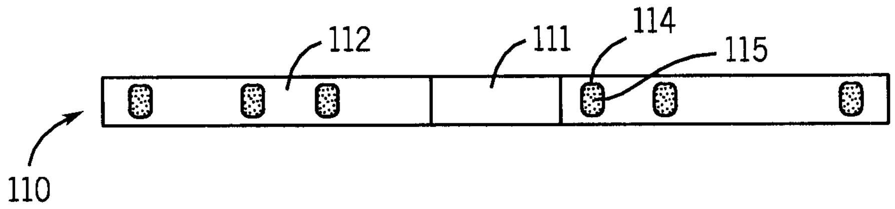
FIG. 16 shows a plan view of the tag of FIG. 15 with portions of the liner removed to expose an adhesive and leave die cut portions of the liner having migrating ink thereon adhering to the adhesive.
Figure 17:
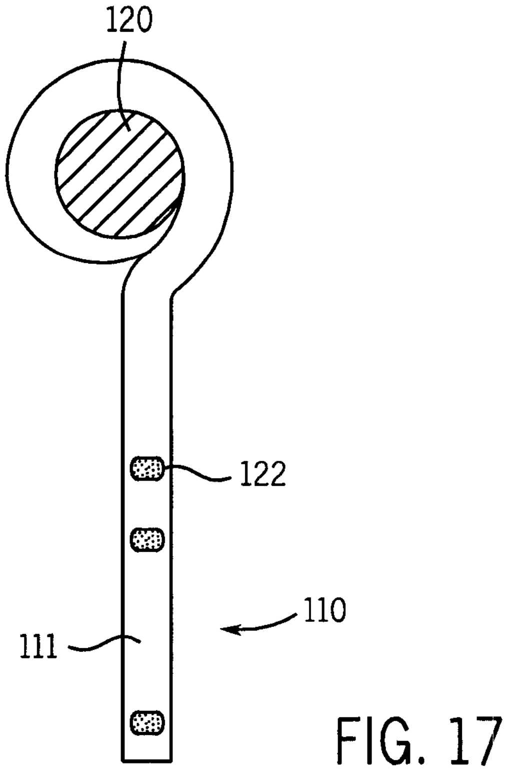
FIG. 17 shows a perspective view of the tag of FIG. 16 folded onto itself and engaging the migrating ink with the exposed adhesive.

FIGS. 15, 16, and 17 depict the construction of a preferred embodiment of a single piece self-expiring tag 110 incorporating the present invention. A clear support substrate 111 is provided. The top or front surface of this substrate 111 has security printing thereon which can be easily viewed. Underlying the clear support substrate 111 is a white or opaque coating or layer of adhesive 112 that serves as background to security printing on a front surface of the clear support substrate 111. A continuous silicone release liner 113 is provided with die-cut areas 114 therein. Each of the die-cut areas 114 has a migrating ink 115 printed thereon. Thus when the continuous silicone release liner 113 is removed these die cut areas 114 remain attached to the adhesive 112 leaving the migrating ink 115 thereon.

FIG. 16 is a bottom view of the self-expiring tag 110 shown in FIG. 15 after removal of the release liner 113 showing that the die-cut areas 114 attached to the adhesive 112.

In use, as shown in FIG. 17, the migrating ink 115 on the die-cut areas 114 makes contact with the adhesive 112 and changes color after a predetermined period of time. After the predetermined period of time expires the void indicium 122 can be viewed after expiration, accented by the white adhesive 112.

In the embodiment shown in FIGS. 15, 16, and 17, the migrating ink 115 and/or dye are applied to the backside of the release liner 113, so that the release liner 113 is inter disposed between the migrating ink 115 and the activating adhesive 112. In this construction, the migrating ink 115 is printed on the release liner 113 and the release liner 113 is divided into two or more independent release liners by die-cutting the release liner 113 around the printed migrating ink 115 forming die cut areas 114 without cutting through the substrate 111. Each die cut area 114 defining a release liner along with release liner 113. Thus, when the die cut release liner 113 is removed, the die cut areas 114 having migrating ink 115 thereon remain adhered to the adhesive 112 on the self-expiring tag 110. Thus, with these printed areas of migrating ink 115 still attached to the self-expiring tag 110 by the adhesive 112, the self-expiring tag 110 is activated by folding the self-expiring tag 110 over onto itself to contact the migrating ink 115 with the adhesive 112. By properly designing the self-expiring tag 110, the migrating ink 115 will be positioned so that when the self-expiring tag 110 is folded over, such as when wrapped around a luggage handle 120, the migrating ink 115 comes into contact with the activating adhesive 112.

While various changes may be made in the detailed construction and processes of this invention, it will be understood that such changes will be within the spirit and scope of the present invention. Having thus described the invention in detail, it is to be understood that the foregoing description is not intended to limit the spirit and scope thereof. What is desired to be protected by Letters Patent is set forth in the appended claims.

What is claimed is:

1. A single piece tag comprising:

a substrate having a first surface and an opposing second surface;

a first reactant applied to said first surface;

a first release liner covering a first portion of said first reactant on said first surface;

a second reactant applied to said first release liner; and a removable second release liner adjacent said first release liner and covering a second portion of said first reactant, said first release liner having said second reactant thereon separating said first reactant from said second reactant, wherein upon activation, said second release liner is removed from said tag to expose said second portion of said first reactant, and said substrate is folded onto itself to contact the second reactant on said first release liner with said first reactant.

2. The tag as in claim 1, in which said first release liner is separated from said second release liner by a die cut.

3. The tag as in claim 1, including a fold line on which said substrate is folded to contact said second reactant with said exposed first reactant.

4. The tag as in claim 1, in which said second reactant reacts with chemical residue indicating a presence of the chemical residue.

5. The tag as in claim 1, wherein the substrate is transparent.

6. The tag as in claim 5, wherein the second reactant can be viewed through the second surface of the substrate following activation of said tag.

7. The tag as in claim 1, in which said first reactant is an adhesive coating and said second reactant is a migrating ink.

8. A method of making a single-piece tag, said method comprising;

applying a first reactant onto a surface of a substrate;

overlying said first reactant with a first release liner;

applying a second reactant onto portions of said first release liner; and forming a second release liner from said first release liner, said second release liner having said second reactant thereon and separating said second reactant from said first reactant.

9. The method as in claim 8, in which said second reactant reacts with chemical residue indicating a presence of the chemical residue.

10. The method as in claim 8, wherein the substrate is transparent.

11. The method as in claim 10, wherein the second reactant can be viewed through the substrate following activation of said tag.

12. The method as in claim 8, in which said second release liner is formed by die cutting said first release liner.

13. The method as on claim 8, in which said first reactant is an adhesive coating and said second reactant is a migrating ink.

14. A method of activating a single-piece tag as in claim 8, said method comprising:

removing said first release liner from said tag, wherein said second release liner having said second reactant thereon remains on said tag separating said second reactant from said first reactant upon removal of said first release liner from said tag; and folding said substrate onto itself to contact said second reactant on said second release liner with said first reactant.

15. The method as in claim 14, in which said substrate is folded along a fold line.

* * * * *